United States Patent
Sirola et al.

(10) Patent No.: US 10,665,364 B2
(45) Date of Patent: *May 26, 2020

(54) CORROSION PROTECTION OF BURIED METALLIC CONDUCTORS

(71) Applicant: SHORE ACRES ENTERPRISES INC., Barrie (CA)

(72) Inventors: Brien Todd Sirola, Barrie (CA); Donald Brien Sirola, Barrie (CA); Graham Hagens, Hamilton (CA)

(73) Assignee: SHORE ACRES ENTERPRISES INC., Barrie (CA)

(*) Notice: Subject to any disclaimer, the term of this patent is extended or adjusted under 35 U.S.C. 154(b) by 9 days.

This patent is subject to a terminal disclaimer.

(21) Appl. No.: 15/955,784

(22) Filed: Apr. 18, 2018

(65) Prior Publication Data

US 2018/0286534 A1   Oct. 4, 2018

Related U.S. Application Data

(63) Continuation of application No. 15/043,648, filed on Feb. 15, 2016, now Pat. No. 10,262,773, which is a continuation of application No. PCT/CA2014/050779, filed on Aug. 15, 2014.

(60) Provisional application No. 61/866,599, filed on Aug. 16, 2013.

(51) Int. Cl.
*H01B 7/28* (2006.01)
*C09K 5/04* (2006.01)
*C09D 5/08* (2006.01)
*H01B 7/282* (2006.01)
*H01B 13/32* (2006.01)

(52) U.S. Cl.
CPC ............. *H01B 7/2806* (2013.01); *C09D 5/08* (2013.01); *C09K 5/044* (2013.01); *H01B 7/282* (2013.01); *H01B 7/2825* (2013.01); *H01B 13/32* (2013.01); *Y02A 30/14* (2018.01)

(58) Field of Classification Search
CPC ........ H01B 7/28; H01B 7/2806; H01B 13/32; H01B 7/2825; H01B 7/282; C09K 5/044; C09D 5/08; Y02A 30/14

USPC .............. 428/323; 427/58, 96.2, 96.6, 122; 252/510, 511

See application file for complete search history.

(56) References Cited

U.S. PATENT DOCUMENTS

| | | | |
|---|---|---|---|
| 2,196,172 A | 6/1837 | Billings et al. | |
| 1,661,712 A | 3/1928 | Wagner | |
| 3,334,040 A | 8/1967 | Conrad et al. | |
| 3,716,649 A | 2/1973 | Walker et al. | |
| 4,192,963 A | 3/1980 | Koehmstedt | |
| 4,908,157 A | 3/1990 | Fontana et al. | |
| 5,098,771 A | 3/1992 | Friend | |
| 5,476,612 A | 12/1995 | Wessling et al. | |
| 5,525,208 A | 6/1996 | Pritula et al. | |
| 5,700,398 A | 12/1997 | Angelopoulos et al. | |
| 5,976,419 A | 11/1999 | Hawkins et al. | |
| 7,405,247 B2 | 7/2008 | Sachdev et al. | |
| 7,422,789 B2 | 9/2008 | Avakian et al. | |
| 7,578,910 B2 | 8/2009 | Sirola et al. | |
| 7,619,161 B2 | 11/2009 | Okabayashi et al. | |
| 7,745,528 B2 | 6/2010 | Prud'Homme et al. | |
| 7,794,626 B2 | 9/2010 | Horton | |
| 10,109,392 B2 | 10/2018 | Maunder et al. | |
| 10,262,773 B2 * | 4/2019 | Sirola | C09D 5/08 |
| 10,433,371 B2 * | 10/2019 | Miller | H05B 3/58 |
| 2004/0099982 A1 | 5/2004 | Sirola et al. | |
| 2005/0194576 A1 | 9/2005 | Sirola et al. | |
| 2007/0187854 A1 | 8/2007 | Sirola et al. | |
| 2008/0217041 A1 | 9/2008 | Kim | |
| 2009/0233470 A1 | 9/2009 | Kim | |
| 2010/0159148 A1 | 6/2010 | Hagens et al. | |
| 2013/0048917 A1 | 2/2013 | Virtanen et al. | |
| 2014/0251793 A1 | 9/2014 | Funahashi et al. | |
| 2015/0028247 A1 | 1/2015 | Peters | |
| 2016/0163419 A1 | 6/2016 | Sirola et al. | |
| 2019/0103684 A1 * | 4/2019 | Sirola | H01R 43/00 |

FOREIGN PATENT DOCUMENTS

| | | |
|---|---|---|
| JP | 05198321 A | 8/1993 |
| KR | 101089543 B1 | 12/2011 |
| WO | 1997014196 A1 | 4/1997 |

* cited by examiner

*Primary Examiner* — Douglas J McGinty
(74) *Attorney, Agent, or Firm* — ABM Intellectual Property Inc.; Adrienne Bieber McNeil

(57) ABSTRACT

A method for protecting a conductive metal from corrosion, including coating the conductive metal with a water impermeable carbonaceous conductive material to protect the conductive metal from corrosion.

27 Claims, 1 Drawing Sheet

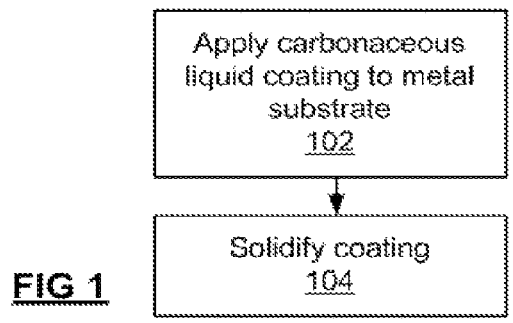
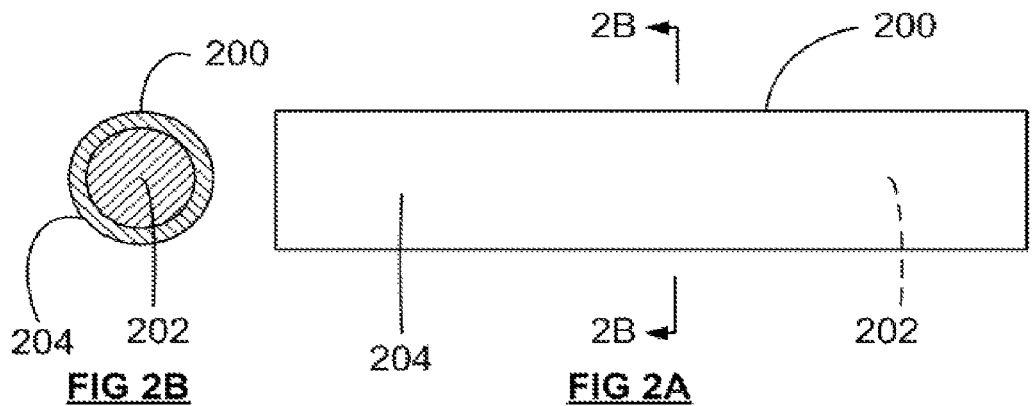
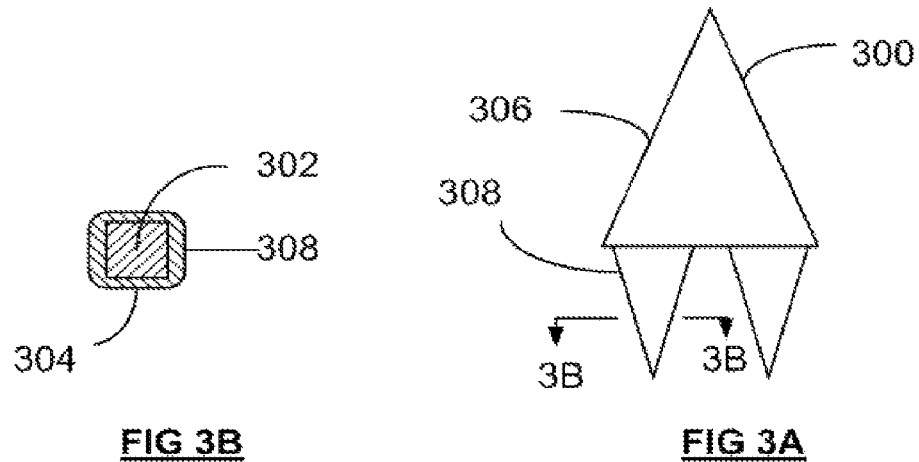

CORROSION PROTECTION OF BURIED METALLIC CONDUCTORS

This application is a continuation of U.S. patent application Ser. No. 15/043,648, filed on Feb. 15, 2016, which is a continuation of International Patent Application No. PCT/CA2014/050779 filed Aug. 15, 2014, which claims priority to and the benefit of U.S. Provisional Patent Application No. 61/866,599 filed Aug. 16, 2013, each of which is incorporated herein by reference in its entirety.

BACKGROUND

The present disclosure relates to corrosion protection of metallic conductors, and at least some embodiments relate to corrosion protection of buried or embedded metallic conductors through the use of conductive coatings.

Corrosion protection and/or coatings used for various purposes are described in a variety of literature, including for example the following U.S. Pat. Nos.: 3,334,040; 4,908,157; 5,098,771; 5,476,612; 5,700,398; 5,976,419; 7,405,247; 7,422,789; 7,578,910; 7,745,528; and 7,794,626.

Over the years the economic cost of the rusting of iron-containing articles, and the electrolytic corrosion of copper conductive wiring has prompted considerable effort to find effective and economical ways to prevent such degradation. It is well known that the electrolytic corrosion of metals is a chemical process during which the metal becomes the anode in an electrical cell involving micro cells which commonly arise as a result of contact between the metallic atoms and contaminants which have different positions on the galvanic scale being more cathodic. Since water is essential for galvanic corrosion to proceed, and since oxygen frequently accelerates the process, most methods commonly employed to mitigate such corrosion involve isolating the metals from air and water. For this purpose barrier coatings including paints, impermeable polymers as well as certain types of metal insoluble metallic salts are frequently employed.

An alternative approach used to protect metals from corrosion involves the use of so-called sacrificial coatings which takes advantage of the Galvanic Series. In this methodology the susceptible metal is mechanically connected to another with a lower electronegative potential. When subjected to conditions favoring electrolysis these more reactive metals are consumed in preference to the more cathodic structure which are protected. Common sacrificial anodes include such metals as aluminum, magnesium, tin or zinc and their alloys.

While the use of sacrificial anodes is not of direct interest to this disclosure, the utilization of non-galvanic electrical conductors, and various polymeric binders to improve the cost effectiveness of the sacrificial anodes is relevant.

A widely used alternate approach far corrosion protection of steel, of particular relevance to buried pipelines, involves connecting the metallic structure to a source of direct electrical current in such a way that the metal to be protected becomes the cathode of the electrolytic coil, and thus preventing corrosion of the protected metal. Although the anode in such a cathodic protection (CP) circuit is not strictly 'sacrificial', in reality a certain amount of erosion of the anode does occur over time as the result of electrochemical activity at the interface of the anode and the surrounding conductive material, which is commonly moist soil.

Most commonly the rate of erosion of such anodes is managed by choice of oxidation resistant conductive materials such as mixed metal oxides or ferrosilicon. Various additional techniques have been developed in order to further extend the lives of these expensive materials, one common method being, utilization of one of a number of types of carbonaceous backfill, which over time becomes preferably oxidised by a non-galvanic oxidative mechanism, thus protecting the more valuable metallic anode. Art alternative approach to the use of carbonaceous backfill involves various types of conductive carbonaceous compositions which are installed in direct contact with the metallic anode. It is necessary that such protective materials have the ability to both protect the steel surface from air and moisture, and also to allow the egress of such gases which might be generated in the oxidative environment of the anode.

While many of the above processes can be used to protect anodes subject to deliberately induced electrical currents, there is also a requirement to protect steel structures and buried copper cable utilized for grounding purposes, which are subject both to accidentally induced currents which render such installations anionic, and chemically corrosive underground water systems. Existing systems do not provide an acceptable solution to this particular problem which buried metals that for one reason or another are affected by stray direct electrical current in such a manner that they become anodes in a galvanic cell. The economic cost of such corrosion is extremely high.

SUMMARY

According to example embodiments, there is provided a method for protecting a conductive metal from corrosion, including coating the conductive metal with a water impermeable carbonaceous conductive material to protect the conductive metal from corrosion.

BRIEF DESCRIPTION OF THE DRAWINGS

FIG. 1 is a flow diagram illustrating a method of providing corrosion protection to a metallic conductor according to an example embodiment.

FIG. 2A is a schematic view of a conductive wire provided with corrosion protection according to an example embodiment.

FIG. 2B is a sectional view taken along the lines 2B-2B of FIG. 2A.

FIG. 3A is a schematic view of a conductive structure such as a pylon provided with corrosion protection according to an example embodiment.

FIG. 3B is a sectional view taken along the lines 3B-3B of FIG. 3A.

DESCRIPTION

Procedures known from existing systems to metal corrosion in the context of buried or embedded conductive metals suffer from various shortcomings. For example, the known processes most commonly employed today involve the use of non-conductive water resistant barrier coatings, such as are widely used to prevent the rusting of steel structures or buried cables not subject to direct electrical potential such as fences, tanks, and so on. When such non-conductive coatings are employed, small pinholes in the coating can sometimes occur, this can result in severely destructive pinhole corrosion that can lead to degradation of the entire structure. This corrosion mechanism is exacerbated by the fact that many of the protective coatings currently employed are formulated from crosslinked polymers such as epoxies, urethanes or zinc silicates which are typically rigid and inflexible. As such these coatings are known to be prone to perforation or cracking during the shipping or emplacement of the steel structures. The protective membranes disclosed to date are quite brittle, and prone to fracture during manufacture or installation of the steel structures. Moreover, if these coatings are compromised by mechanical or electrical forces such that the membrane develops small holes or fissures, then the rate of corrosion at these flawed sections is greatly accelerated by the process known as pinhole corrosion. Another shortcoming of existing systems is that the majority of the protective membranes employed utilize precursors which contain toxic and expensive volatile organic compounds.

Utilization of sacrificial coatings is also unsuitable for installations such as pylons and buried cables which are expected to remain in service for many decades and are often located considerable distances from repair facilities, during which time sacrificial anodes are likely to be completely consumed.

An example embodiment described herein provides a method of corrosion protection that utilizes a coating or membrane formed from one or more water impermeable carbonaceous electrical conductors in such a way that electrons flow to a non-corrosive environment without water making contact with the metallic substrate to which the membrane has been applied. In such a method, the electrical current is thus transferred to a non-corrosive region of the structure via electronic rather than electrolytic mechanism during which the rate of galvanic oxidation of both the carbonaceous transfer medium (the coating or membrane) and the metallic core (the conductive metal) are greatly reduced.

Example embodiments are described herein for a new and improved coating system and method of producing the same, which overcomes one or more of the existing difficulties in order to provide a greater longevity of protection.

As disclosed herein, in at least some example embodiments, metallic galvanic corrosion is greatly minimized when metals coated with superior water resistant carbonaceous membranes are subject to electric current. In the event that the metallic structure is induced to become the anode in an electrolytic cell—and thus susceptible to anodic corrosion—it is protected by such membranes. Moreover, in the event that the current is reversed, such that the metal becomes the cathode of the electrical circuit, the metal is prevented from corroding by the well-known process of cathodic protection. Consequently various metals, most importantly iron (steel) and copper, can be protected to at least some extent from such electrolytic anodic corrosion.

A further example embodiment addresses the unusual situation in which the metallic substrate both makes direct contact with the metal during which no electrical current is flowing through the system, and a physical breach of the membrane allows the ingress of water to the metal-carbon interface. In this example embodiment, the formulation of the protective coating can be configured to be self-healing to prevent ingress of water.

In at least some example embodiments, in order to be effective such protective membranes are required to have the following properties: resistance to physical damage, electrical resistivity less than 10,000 ohm-cm, and sufficient flexibility and resiliency as required for handling purposes.

In at least some example embodiments, the coating materials described herein can be applied to above ground industrial structures which might be subject to induced currents such as embedded steel pylons, or to buried grounding systems containing copper conductors.

In addition, in at least some example embodiments, the protective coating systems described herein may have one or more of the following desirable features. In the case where steel pylons are being protected, the membrane in its pre-cured form consists of or includes a non-flammable water based composition free of volatile organic compounds and without toxic additives such as lead oxides or chromates; it may be modified with various thickening agents in order to be sprayed onto both vertical and horizontal surfaces and cure rapidly under normal ambient temperatures; and treated with microbicidal additives to minimise biological damage by bacterial or other organisms present in the soil.

FIG. 1 illustrates an example of a method for protecting a metallic conductor (also referred to herein as a metal substrate) by coating the conductive metal with a water impermeable carbonaceous conductive membrane. As indicated in step 102, a liquid coating is applied to the metal substrate. As indicated in step 104, the coating is then solidified (for example through curing or setting) to provide a water impermeable coating or membrane. In some examples, the resulting membrane could have elastomeric qualities and have a thickness of between 0.01 inches to 0.5 inches.

According to example embodiments, the protective coatings or membranes described herein may be applied (step 102) to metallic substrates by a number of different methods depending on requirements. Without limiting the scope of possible application methods, in at least some examples, the uncured coatings may be dispersed in liquid carriers such as water or organic solvents, into which the item to be protected may be dipped, or alternatively, the item to be protected may be coated by spraying, brush or roll-on techniques. In the case of metallic wires or cables, the metal to be protected may for example be passed through an extruder or laminater if the carrier for the protective membrane is a thermo-plastic, or two part chemically crosslinked system according to methods familiar to those skilled in the art of cable manufacture.

After curing or setting (step 104) these compositions yield abrasion resistant coatings to protect the structure during movement or installation. Curing could for example include air curing at ambient temperatures, or heat assisted curing, among other possible curing techniques.

In at least some example embodiments, the protective coating system comprises, in its liquid state, a dispersion of conductive carbonaceous materials in certain elastomeric polymers in order to yield products (e.g. membranes 204, 304) with the performance characteristics set out in Table A below:

TABLE A

| | |
|---|---|
| (i) | electrical resistivity between 20 to 10000 ohm-cm |
| (ii) | water permeability better than $10^{-5}$ cm/second, and in some examples between $10^{-7}$ to $10^{-9}$ cm/second |
| (iii) | in addition to a high degree of water resistance, should permit the egress of gases which result from anodic electrolysis. |
| (iv) | sufficient hardness, tensile strength and flexibility to withstand physical stress, and, in the case of application to a wire or cable, capable of being rolled onto a spool after manufacture; and |
| (v) | sufficient resistance to micro-organisms to survive under the soil for long durations. |

In example embodiments, carbon is combined with a polymeric binder to form a material that is suitable for use as a protective coating or membrane. In at least one example embodiment, the carbon source used to form the protective coating material is a particular type of high purity, coke breeze which is characterized by spherical particles with the size range of about 30 to 70 mesh (an example of such material may be purchased under the trade name Asbury 251 coke breeze). Such a carbon material is formed of particles having a shape and size distribution to facilitate the manufacture of a final coating product with rheological properties suitable for pouring or spraying, to very high levels of carbon. In example embodiments, the ratio of carbon to polymeric binder is selected to optimally both reduce overall cost, and increase the anticipated life time of the protective coating or membrane. The use of a carbon source having the properties described above may in some configurations allow the carbonaceous material used to make up between 60-90% of the membrane on a dry basis. In addition to extending the lifetime of an installation, this higher level of carbon may in at least some applications also improve the electrical conductivity of the system.

In at least some example embodiments, the binder used to form the protective coating is selected from one or more types of organic polymers, although the use of inorganic cementitious binders may be possible in some configurations to provide a non-polymeric rigid conductive coating.

In example embodiments, different types of protective coating product compositions are used to address two identified end uses: first the protection of rigid structures such as pylons, ground rods and rebar (as illustrated in FIGS. 3A and 3B) and second the protection of buried wires and cables (or metal straps), as illustrated in FIGS. 2A and 2B. In this regard, FIGS. 2A and 2B illustrate a corrosion protected wire or cable system 200 that includes a conductive metal in the form of wire or cable 202 that has been coated with a protective coating in the form of water impermeable conductive membrane 204 using the method of FIG. 1. The wire/cable system 200 is flexible and meets the conventional requirements of a wire or cable that can be stored on a spool and subsequently laid under ground. FIGS. 3A and 3B illustrate a corrosion protected rigid structure 300, which may for example be a pylon (such as an electrical power transmission tower or a communications tower) that includes an upper portion 306 that is intended to be located above ground and a lower portion 308 that is to be buried below ground. In the illustrated embodiment, at least the lower portion 308 includes a rigid metallic conductor 302 that is coated with a protective coating in the form of water impermeable conductive membrane 304 using the method of FIG. 1.

Referring to FIGS. 3A and 3B, in the case of the protection of a rigid structure 300, the application of the protective coating as carried out in step 102 will preferably involve the application of liquid material to the metal surface of the rigid structure. Accordingly, in example embodiments in which a protective coating product is designed to be applied to a rigid structure 300, the product may be incorporated into a liquid which could be water or solvent based, and could be applied at ambient temperatures and pressures, by means of brushes or spray equipment known to those skilled in the art.

In the case of the protective coating product suitable for the membrane 304 for rigid structures 300, examples of a polymeric class providing suitable strength and water permeability in the correct range for use in the preparation of liquid formulations are crosslinked styrene acrylic copolymers, or carboxylated styrene butadiene co-polymers, optionally in combination with bituminous emulsions. In addition to having the desired functionality described above, these materials also have the advantage of elasticity and low toxicity both to the environment and human exposure, being free of organic solvents and heavy metals. A significant number of other types of polymeric dispersions such as nonionic, anionic and cationic polychloroprenes, polybutadienes and butadiene acrylonitriles may alternatively be used with varying degrees of performance. Similarly, various other suitable carbonaceous materials could be used to replace Asbury 251 if the resulting cost requirements, and/or the rheology restrictions were not deemed to be prohibitive.

Referring to FIGS. 2A and 2B, in example embodiments, the polymeric class of polymers for use in a productive coating product to provide membrane 204 for extrusion or lamination, with cables or wires 202, includes polyolefins or polyvinyl polymers, or co-polymers including, but not limited to polyethylene, polypropylene or polyvinyl acetate. In at least some examples, the polymers used to form the protective coating or membrane 204 and 304 have suitable strength, flexibility and abrasion resistance to withstand mechanical handling of the conductive wire or steel structures during placement in the soil as required. It is also desirable that the protective membrane 204, 304 have good low temperature flexibility and resistance to ultraviolet light in the event that they are exposed to sunlight and low temperatures in the course of their expected lifetime.

In the case of wire or cable systems 200, example application methods for application step 102 include dipping, extrusion or lamination of water based or solvent free thermoplastic materials which cure quickly enough to enable the resulting wire system 200 to be wound on a reel immediately after manufacture. Accordingly, in such example embodiments, the binder material used in the protective coating product or membrane 204 may include thermoplastic polymers well known in the art of cable manufacture, or two part chemically crosslinked polymers such as urethanes or epoxies. In such embodiments, the protective coating product could be configured to be applied in a diluted liquid form, as a hot melt or as a chemically cross-linked material, by way of example.

In addition, in at least some example embodiments, in order to protect the protective coatings 204, 304 described herein from the extreme temperatures encountered during lightning strikes to which some grounding systems are prone, the consequence of which could be melting of thermoplastic membrane, the coating systems disclosed herein can be combined with known grounding system backfill such as Conducrete DM™ which is known to be capable of resisting the extreme, but short lived, temperature rise that can occur when grounding systems are subjected to a lightning strike.

EXAMPLES

The examples presented below are presented to demonstrate the efficacy of the process here disclosed in reducing the rate of electrolytic (anodic) corrosion of iron (steel) and copper. The results disclosed were obtained by inducing an anodic potential to the metals in an experimental cell. While these specific examples refer only to iron and copper, in at least some embodiments, this process has broad potential applicability to a wide range of elements of various electronegative potentials which might be prone to corrosion in similar electrolytic conditions. In those examples relating to steel, the tests were carried out using 3"×6" steel test plates as anodes in a cell in which the cathode was copper cable, and the electrolyte a dilute (<0.5% by weight) solution of either sodium chloride or sodium sulfate, buffered to pH 7 for the duration of each test. Some of the plates were used as uncoated controls, while the rest were treated in various ways identified in the Example prior to electrolysis. The formulations were all prepared by blending the dry and liquid ingredients using a laboratory mixer. Between 20 and 30 grams of each product were applied to each side of clean plates by means of a doctor blade, and allowed to air cure for 4 days, yielding cured films between 0.04-0.08" thick. The current was maintained between 0.05±0.01 and 0.2±0.01 amps as disclosed. Weight loss was measured before and after each test, and the rate of corrosion determined by weight loss at the end of each experiments is expressed as grams/amp-hour.

In the case of copper, the test metal consisted of 0.04" diameter copper wire, coated by dipping or brushing of the formulation as appropriate, to a thickness of 0.04-0.08", or in the case of the non-polymeric conductive medium (Conducrete DM100), the wire was inserted into a cast cylinder 4" long and 2" in diameter.

From the results of various experiments not reported here a limited number of polymers and additives identified below were identified as being of particular interest, although not limiting to the claims of this submission.

These materials include:
  Styrez HR-1060, a styrene acrylic copolymer emulsion (Halltech Inc., Searborough, Ontario)
  Butonal 1129NS, a styrene butadiene emulsion (Brenntag Inc., Toronto, Ontario)
  "Epoxy" is prepared by mixing two ingredients: Bisphenol-A, or Epoxy Part A (DER 331, Dow Chemical Company, Midland Mich.), and Jeffamine D-230 or Epoxy Part B ((Chemroy Ltd., Toronto, Canada), in the ratio of 3:1 before application.
  50-70 Penetration Bitumen, purchased in the form of a 60% emulsion (Colas Ltd., Waddington Lancashire, UK).

The examples identified below possess properties within the performance range identified in Table A above, although it is possible that example embodiments could have one or more performance characteristics that fall outside of the ranges identified in Table A.

Example 1

Water Impermeable Conductive Coating Reduces Electrolytic Corrosion of Steel

The data given in Table 1 were obtained comparing the weight loss of two 3"×6" steel panels subjected to electrolysis for the same period of time. The first was a clean uncoated plate, while the second was coated with a 50/50 blend of Asbury 251 and Styrez 1060. The reduction in the rate of loss was 93.1%

TABLE 1

| Plate | Asbury 251 % w/w | Styrez 1060 % w/w | Amps | Gm lost/ amp-hour | Percent Improved |
|---|---|---|---|---|---|
| 1 | — | — | 0.2 | 1.16 | N/A |
| 2 | 50 | 50 | 0.2 | 0.08 | 93.1 |

Example 2

Demonstration that Impermeable Conductive Coating Effectively Reduces Corrosion of Steel when Small Surface Areas are Exposed to Water.

Since the of existence small cracks and fissures represent a primary contributor to the rate of corrosion of buried installations due to the phenomenon of pinhole corrosion, experiments were conducted to determine the results when very small surface area of the plate was subjected to the electrical current. These experiments were performed by drilling small holes in previously coated plates.

In Table 2 the control sample consisted of a 3"×6" steel plate coated on both sides with 1 mm thickness membrane of Butonal 1129NS, into which on one side was drilled a 0.1 square inch hole. The test plate coated on both sides with a 50/50 mixture of Styrez 1060 and Asbury 251, also had 0.1 inch$^2$ hole drilled on one side. Electrolytic conditions were the same as described in Example 1. In this case the rate of corrosion was improved by 82.9%.

TABLE 2

| Series | Asbury 251 % w/w | Styrez 1060 % w/w | Amps | Test Area (inch$^2$) | Gm lost/ amp-hour | Percent improved |
|---|---|---|---|---|---|---|
| 1 | — | — | 0.2 | 0.1 | 0.41 | N/A |
| 2 | 50 | 50 | 0.2 | 0.1 | 0.07 | 82.9% |

Example 3

Impermeable Conductive Coating Using an Epoxy Binder Reduces the Rate of Electrolytic Pin-Hole Corrosion of Steel The results given in Table 3 were obtained using similar conditions to those in Example 2, but with much smaller pinholes, only 0.04" in diameter, yielding an exposed area of 0.005 inch$^2$, or 0.01% of the total plate surface. In these experiments, the control plate was coated with non-conductive epoxy, while the test panels included combinations of Asbury 251 and epoxy at two thicknesses as carrier for the carbon, and two different ratios of Asbury 251 and Styrez 1060. The relatively poor results obtained with the 80/20 mixture of carbon and polymer confirm the earlier data that superior results are obtained at lower carbon levels.

TABLE 3

| Series | Asbury 251 % w/w | Styrez 1060 % w/w | Epoxy % w/w | Thickness (inches) | Test Area (inch$^2$) | Gm lost/ amp-hour | Percent improved |
|---|---|---|---|---|---|---|---|
| 1 | — | — | 100 | 0.13 | 0.005 | 0.65 | N/A |
| 2 | 60 | — | 40 | 0.03 | 0.005 | 0.23 | 64.6% |
| 3 | 60 | — | 40 | 0.07 | 0.005 | 0.21 | 67.7 |
| 4 | 50 | 50 | — | 0.07 | 0.005 | 0.16 | 75.4 |
| 5 | 80 | 20 | — | 0.07 | 0.005 | 0.43 | 33.8 |

These results reveal that while thickness of the conductive coating may not affect the efficiency of the process (compare Series 2 and 3), the precise composition of the coatings does make a difference (compare Series 3, 4 and 5).

Example 4

Experiments on Different Asbury/Styrez Compositions in Table 4 Reveal that in at least Some Examples, Superior Protection is Obtained when the Weight Ratio of Asbury 251 Carbon to Styrez 1060 is Between the Range of 40/50 and 60/40, the Maximum Improvement Observed Being 95.2%.

TABLE 4

| Series | Asbury 251 % w/w | Styrez1060 % w/w | Amps | Test Area (inches²) | Gm lost/ amp-hour | Percent improved |
|---|---|---|---|---|---|---|
| 1 | — | — | 0.1 | 9 | 1.45 | N/A |
| 2 | 35 | 65 | 0.1 | 9 | 0.27 | 81.4% |
| 3 | 50 | 50 | 0.1 | 9 | 0.07 | 95.2 |
| 4 | 65 | 35 | 0.1 | 9 | 0.10 | 93.1 |

Example 5

Experiments to Show that Electrically Conductive Carbonaceous Concrete Reduces the Rate of Electrolytic Corrosion of Copper Wire.

In this experiment the electrolyte was dilute sodium sulfate.

These experiments were conducted by inserting copper with into a 4"×2" cylinder of cured Conducrete DM 100, to a depth of 3". Series 1 reveals the rate of weight loss from unprotected copper wire.

TABLE 5

| Series | Conducrete | Amps | Gm lost/ amp-hour | Percent improved |
|---|---|---|---|---|
| 1 | — | 0.05 | 0.53 | N/A |
| 2 | 100 | 0.05 | 0.033 | 93.8% |

Example 6

Electrically Conductive Carbonaceous Concrete Reduces the Rate of Electrolytic Corrosion of Copper Wire Exposed to Sea Water The protection of hurled copper cables from sea water or under ground brine is of considerable commercial interest. As illustrated in Example 6 replacement of copper wire or cable in Conducrete DM 100 reduced the rate of electrolytic

TABLE 6

| Series | Conducrete | Amps | Gm loss/ amp-hour | Percent improved |
|---|---|---|---|---|
| 1 | — | 0.05 | 1.646 | N/A |
| 2 | 100 | 0.05 | 0.153 | 90.7% |

Example 7

Rate of Copper Corrosion Reduced when Coated with a Combination of Thermoplastic Polymers and Carbon: Results Obtained with Low Molecular Weight Polyethylene In this experiment the copper wire was coated with a blend of thermoplastic polyethylene and Asbury 251 to a thickness of 0.08", and electrolyzed using a dilute solution of sodium sulfate as electrolyte.

TABLE 7

| Series | Asbury 251 % w/w | Polyethylene % w/w | Amps | Gm lost/ amp-hour | Percent improved |
|---|---|---|---|---|---|
| 1 | — | — | 0.10 | 1.43 | N/A |
| 2 | 85 | 15 | 0.10 | 0.14 | 90.2% |

Example 8

Rate of Copper Erosion is Reduced when Coated with a Combination of Thermosetting Polymers and Carbon: Results Obtained with Epoxy Blends In these series the copper wire was immersed in a cured blend of Asbury 251 and epoxy formed into a cylinder 3" long, 2.2" in diameter. As illustrated in Table 8, the optimum ratio of Asbury carbon to epoxy is between 75/25 and 80/20.

TABLE 8

| Series | Asbury 251 % w/w | Epoxy % w/w | Amps | Gm lost/ amp-hour | Percent improved |
|---|---|---|---|---|---|
| 1 | — | — | 0.10 | 1.43 | N/A |
| 2 | 90 | 10 | 0.10 | 0.67 | 53.1% |
| 3 | 80 | 20 | 0.10 | 0.135 | 90.6% |
| 4 | 70 | 30 | 0.10 | 0.24 | 83.2% |

Example 9

Metallic Corrosion Protection Utilizing Self Sealing Formulations

3"×6" plates were coated with a 0.04" thick membrane of various conductive and non-conductive coatings shown in Table 1, which after curing were cross-hatched to the bare steel, and immersed in tap water with no additional electrolytes, for a period of 1 month. After this time the coatings were removed, and the degree of corrosion evaluated visually by examining the extent of rust in proximity to the X-cross hatch, and general darkening beneath the membrane. The results of some non-conductive coatings are presented for interest only, since for the purpose of this disclosure, only the performance of conductive membranes are relevant. As illustrated in Table 9, where the results are ranked from best (at top) to worst, similar degrees of corrosion were observed with many of the conductive and non-conductive coatings. Superior performance was obtained with a combination of Asbury 251 carbon and medium penetration bitumen (Colas 50-70, Colas Inc. Lancashire, England). This superior performance is attributed to the ability of medium and high penetration bitumen grades to flow towards breaches in protective coatings. Of particular interest to this disclosure is that a 50/50 combination of Asbury 251 and Colas 50-70 exhibits both corrosion protection and excellent electrical conductivity. Halltech HR 38-19 is a very soft styrene—acrylic co-polymer, examined here for potential protective properties

TABLE 9

| Formula | Ohms | mm X | Observation |
|---|---|---|---|
| Conductive coatings | | | |
| 50/50 251/Colas 50-70 | 50 | 0.2 | Bright |
| 40/60 251/Colas 50-70 | 40 | 1.0 | Bright |
| 70/30 251/38-19 | 200 | 2.0 | Widespread darkening |
| 60/40 251/38-19 | 20 | 2.5 | Widespread darkening |
| 50/50 251/38-19 | 50 | 1.5 | Widespread darkening |
| Non-conductive | | | |
| Colas 50-70 | >$10^6$ | 0.2 | Bright |
| 0/100 251/epoxy | >$10^6$ | 12.0 | Dark around X only |
| 40/60 251/epoxy | >$10^6$ | 10.0 | Dark around X only |
| 50/50 251/epoxy | >$10^6$ | 2.0 | Dark around X only |
| 60/40 251/epoxy | 20,000 | 0.2 | Dark around X only |
| Halltech HR 1060 | >$10^6$ | 2.0 | Dark around X only |

While example embodiments have been shown and described herein, it will be obvious that each such embodiments are provided by way of example only. Numerous variations, changes, and substitutions will occur to those skilled in the art without departing from the invention disclosed.

The invention claimed is:

1. A corrosion-protected electrically conductive assembly, the assembly comprising:
    a conductive metal element; and
    a coating on the conductive metal element, wherein the coating is highly water impermeable for protecting the conductive metal element from corrosion, and is electrically conductive for conducting a current from the conductive metal element;
    wherein the coating consists essentially of a conductive carbonaceous material dispersed in a polymeric material.

2. The assembly of claim 1, wherein the coating has a thickness of at least 0.01 inches.

3. The assembly of claim 1, wherein the coating has an electrical resistivity of less than 10,000 ohm-cm and a water permeability of less than 10-5 cm/second.

4. The assembly of claim 1, wherein the polymeric material comprises an organic polymer.

5. The assembly of claim 1, wherein the coating is essentially free of metal particles.

6. The assembly of claim 1, wherein the conductive metal element is a rigid structure.

7. The assembly of claim 6, wherein the conductive metal element is an embedded steel pylon.

8. The assembly of claim 6, wherein the rigid structure is a pylon, a ground rod, or rebar.

9. The assembly of claim 8, wherein the rigid structure is a pylon, and the pylon is an electrical power transmission tower or a communications tower.

10. The assembly of claim 1, wherein the conductive metal grounding element is a wire, cable, or metal strap.

11. The assembly of claim 10, wherein the conductive metal grounding element is a wire or a cable and the assembly is wound onto a spool.

12. The assembly of claim 1, wherein the carbonaceous material makes up at least 35% of the coating by weight.

13. The assembly of claim 12, wherein the carbonaceous material makes up between 60% and 90% of the coating by weight.

14. An electrically grounded and corrosion-protected installation, comprising:
    a conductive metal element having at least a portion that is buried in the earth; and
    a coating on the portion of the conductive metal element that is buried in the earth, wherein the coating is highly water impermeable for protecting the conductive metal element from corrosion, and is electrically conductive for conducting a grounding current from the conductive metal element to a surrounding grounding medium;
    wherein the coating consists essentially of a conductive carbonaceous material dispersed in a polymeric material.

15. The installation of claim 14, wherein the conductive metal element is part of a rigid structure and comprises a lower portion that is buried in the earth and an upper portion that is above the lower portion.

16. The installation of claim 14, further comprising an electrically conductive backfill surrounding the portion that is buried in the earth.

17. The installation of claim 14, wherein the conductive metal element is entirely buried in the earth.

18. The installation of claim 17, wherein the conductive metal element is a wire, cable, or strap.

19. The installation of claim 14, wherein the conductive metal element comprises a copper conductor.

20. The installation of claim 14, wherein the conductive metal element is a part of an electrical power transmission tower or a communications tower.

21. A coating for a conductive metal element, the coating consisting essentially of:
    a polymeric material; and
    a conductive carbonaceous material dispersed in the polymeric material;
    wherein the coating is water impermeable for protecting the conductive metal element from corrosion and electrically conductive for conducting a grounding current from the conductive metal element to a surrounding grounding medium.

22. The coating of claim 21, wherein the coating has a thickness of at least 0.01 inches.

23. The coating of claim 21, wherein the coating has an electrical resistivity of less than 10,000 ohm-cm and a water permeability of less than 10-5 cm/second.

24. The coating of claim 21, wherein the polymeric material comprises an organic polymer.

25. The coating of claim 21, wherein the coating is essentially free of metal particles.

26. The assembly of claim 21, wherein the carbonaceous material makes up at least 35% of the coating by weight.

27. The assembly of claim 21, wherein the carbonaceous material makes up between 60% and 90% of the coating by weight.

* * * * *

UNITED STATES PATENT AND TRADEMARK OFFICE
CERTIFICATE OF CORRECTION

PATENT NO. : 10,665,364 B2
APPLICATION NO. : 15/955784
DATED : May 26, 2020
INVENTOR(S) : Sirola et al.

It is certified that error appears in the above-identified patent and that said Letters Patent is hereby corrected as shown below:

In the Specification

Column 2, Line 6, "Art" should read --An--.

Column 2, Line 21, "problem which" should read --problem in which--.

Column 2, Line 53, "to metal" should read --to minimize metal--.

Column 4, Line 11, "microbicidal" should read --microbiocidal--.

Column 7, Line 23, "Searborough" should read --Scarborough--.

Column 9, Line 38, cancel the text beginning with "The protection of hurled copper cables" and ending with "rate of electrolytic" in Column 9, Line 41, and insert the following text: --The protection of buried copper cables from sea water or under ground brine is of considerable commercial interest. As illustrated in Example 6, emplacement of copper wire or cable in Conducrete DM 100 reduced the rate of electrolytic corrosion in sea water by 90.7%.--.

In the Claims

Column 11, Line 23, "10-5 cm/second" should read --$10^{-5}$ cm/second--.

Column 12, Line 40, "10-5 cm/second" should read --$10^{-5}$ cm/second--.

Signed and Sealed this
Fourteenth Day of July, 2020

Andrei Iancu
*Director of the United States Patent and Trademark Office*